United States Patent
Zhou

(10) Patent No.: US 8,538,148 B2
(45) Date of Patent: Sep. 17, 2013

(54) BRIGHTNESS ENHANCEMENT METHOD, SYSTEM AND APPARATUS FOR LOW POWER ARCHITECTURES

(75) Inventor: Jianping Zhou, Fremont, CA (US)

(73) Assignee: Intel Corporation, Santa Clara, CA (US)

(*) Notice: Subject to any disclaimer, the term of this patent is extended or adjusted under 35 U.S.C. 154(b) by 432 days.

(21) Appl. No.: 12/890,372

(22) Filed: Sep. 24, 2010

(65) Prior Publication Data

US 2012/0076407 A1    Mar. 29, 2012

(51) Int. Cl.
*G06K 9/00*    (2006.01)

(52) U.S. Cl.
USPC ............................ 382/168; 382/132; 382/162

(58) Field of Classification Search
USPC ................................... 382/132, 162, 168, 169
See application file for complete search history.

(56) References Cited

U.S. PATENT DOCUMENTS

| | | | |
|---|---|---|---|
| 5,822,453 A | 10/1998 | Lee et al. | |
| 2002/0171852 A1 | 11/2002 | Zhang et al. | |
| 2007/0047808 A1* | 3/2007 | Choe et al. | 382/169 |

FOREIGN PATENT DOCUMENTS

| | | |
|---|---|---|
| JP | 2009182599 | 8/2009 |
| KR | 10-2010-0067778 | 6/2010 |

OTHER PUBLICATIONS

D. Jobson et al., "A multiscale retinex for bridging the gap between color images and the human observation of scenes," IEEE Trans. Image Processing, vol. 6, No. 7, Jul. 1997.
V. Brajovic, "Brightness perception, dynamic range, and noise: a uniform model for adaptive image sensors," IEEE Conf. Computer Vision and Pattern Recognition, vol. 2, pp. 189-196, 2004, Jun. 27, ~ Jul. 2, 2004.
International Search Report and Written Opinion for PCT Patent Application No. PCT/US2011/053244, mailed on Mar. 26, 2012.

* cited by examiner

*Primary Examiner* — Chan S Park
*Assistant Examiner* — Eueng-Nan Yeh
(74) *Attorney, Agent, or Firm* — Kacvinsky Daisak PLLC

(57) ABSTRACT

Embodiments are described for a brightness enhancement method, system and apparatus for low power architecture. A histogram of a contrast image may be generated. One or more parameters may be set based on the histogram. A tone mapping for the contrast image may be determined based on the one or more parameters. An output pixel may be determined based on the tone mapping.

17 Claims, 6 Drawing Sheets

BRIGHTNESS ENHANCEMENT METHOD, SYSTEM AND APPARATUS FOR LOW POWER ARCHITECTURES

BACKGROUND

Brightness enhancement methods are widely used in photographic, video and display processing applications as digital cameras and video recorders have a much smaller dynamic range than nature scenes. Conventional captured or rendered high dynamic range images of the digital cameras and videos often lose details in shadows or highlights.

To provide good image quality, brightness enhancement methods are employed to optimize tone reproduction and enhance contrast and details of digital images and videos. As a result, brightness enhancement methods have been implemented in digital signal processors (DSP), image signal processors (ISP), video processors, display processors and graphics processing units (GPU). Existing brightness enhancement methods require intensive computation and high power consumption. Due to the intensive computation and high power consumption, existing brightness enhancement methods are not suitable for low power architectures or devices. Consequently, there exists a substantial need for a brightness enhancement method which does not require intensive computations and/or high power consumption.

DETAILED DESCRIPTION

The embodiments are generally directed to techniques designed to reduce power consumption without using intensive computations for brightness enhancement on a smooth filtered image. Various embodiments provide techniques that include a brightness enhancement method, system and apparatus for low power architecture. A histogram of a contrast image may be generated. One or more parameters may be set based on the histogram. A tone mapping for the contrast image may be determined based on the one or more parameters. An output pixel may be determined based on the tone mapping.

Brightness enhancement techniques have used intensive computational operations which consume a large amount of power. As such, there exists no efficient means today to enhance brightness while maintaining high performance and good image quality. Consequently, various embodiments described herein provide an efficient means to achieve a brightness enhanced image along with using an edge-preserving smooth filter for low power devices. The various embodiments described herein may include operations such as smoothing, filtering, histogram computations and pixel point mapping. The various embodiments described herein may be more than twenty times faster than current brightness enhancement methods. The various embodiments described herein may consume twenty times less power than existing brightness enhancement methods.

Embodiments may include one or more elements. An element may comprise any structure arranged to perform certain operations. Each element may be implemented as hardware, software, or any combination thereof, as desired for a given set of design parameters or performance constraints. Although embodiments may be described with particular elements in certain arrangements by way of example, embodiments may include other combinations of elements in alternate arrangements.

It is worthy to note that any reference to "one embodiment" or "an embodiment" means that a particular feature, structure, or characteristic described in connection with the embodiment is included in at least one embodiment. The appearances of the phrases "in one embodiment" and "in an embodiment" in various places in the specification are not necessarily all referring to the same embodiment.

Figure 1:
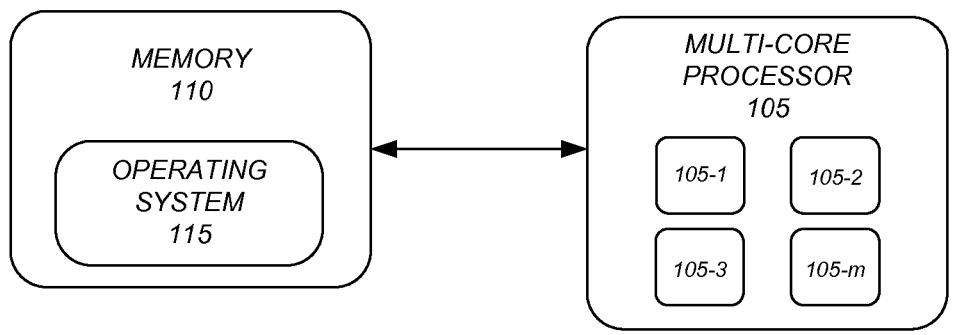
FIG. 1 illustrates one embodiment of an apparatus.

FIG. 1 illustrates one embodiment of an apparatus. FIG. 1 illustrates a block diagram of an apparatus 100. Apparatus 100 may comprise a computing system in some embodiments. As shown in FIG. 1, apparatus 100 comprises multiple elements, such as a multi-core processor 105 including cores 105-1-m, a memory 110 and an operating system 115. The embodiments, however, are not limited to the elements or the configuration shown in this figure.

In various embodiments, multi-core processor 105 may comprise a central processing unit may include one or more processor cores 105-1-m. The processor 105 may include any type of processing unit, such as, but not limited to, a computer processing unit (CPU), a multi-processing unit, a digital signal processor (DSP), a graphical processing unit (GPU) and an image signal processor. Alternatively, the multi-core processor may include a graphics accelerator or an integrated graphics processing portion. The present embodiments are not restricted by the architecture of the multi-core processor 105, so long as processor 105 supports the modules and operations as described herein. In one embodiment, the processor 105 may be a multi-core processor. In one embodiment, the processor 105 may be a single-core processor. Although only one processor 105 is illustrated in FIG. 1, in other embodiments, more than one processor may be used to enhance brightness. The processor 105 may execute the various logical instructions according to the present embodiments.

In various embodiments, memory 110 may comprise any suitable type of memory unit, memory device, memory article, memory medium, storage device, storage article, storage medium, a non-transitory storage medium and/or storage unit, for example, memory, removable or non-removable media, volatile or non-volatile memory or media, erasable or non-erasable media, writeable or re-writeable media, Random Access Memory (RAM) which may include, but is not limited to SRAM, DRAM and SDRAM, Read Only Memory (ROM) which may include, but is not limited to PROM, EPROM and EEPROM, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like.

Operating system (OS) 115 may comprise an interface between various hardware components of apparatus 100 and a user in some embodiments. In various embodiments, OS 106 may be responsible for the management and coordination of activities and the sharing of the resources of the computing system 100. In some embodiments, OS 115 may act as a host for a variety of computing applications run on computing system 100. For example, OS 115 may comprise a Windows© operating system by Microsoft Corporation© of Redmond, Wash. in some embodiments. Other embodiments are described and claimed.

Figure 2:
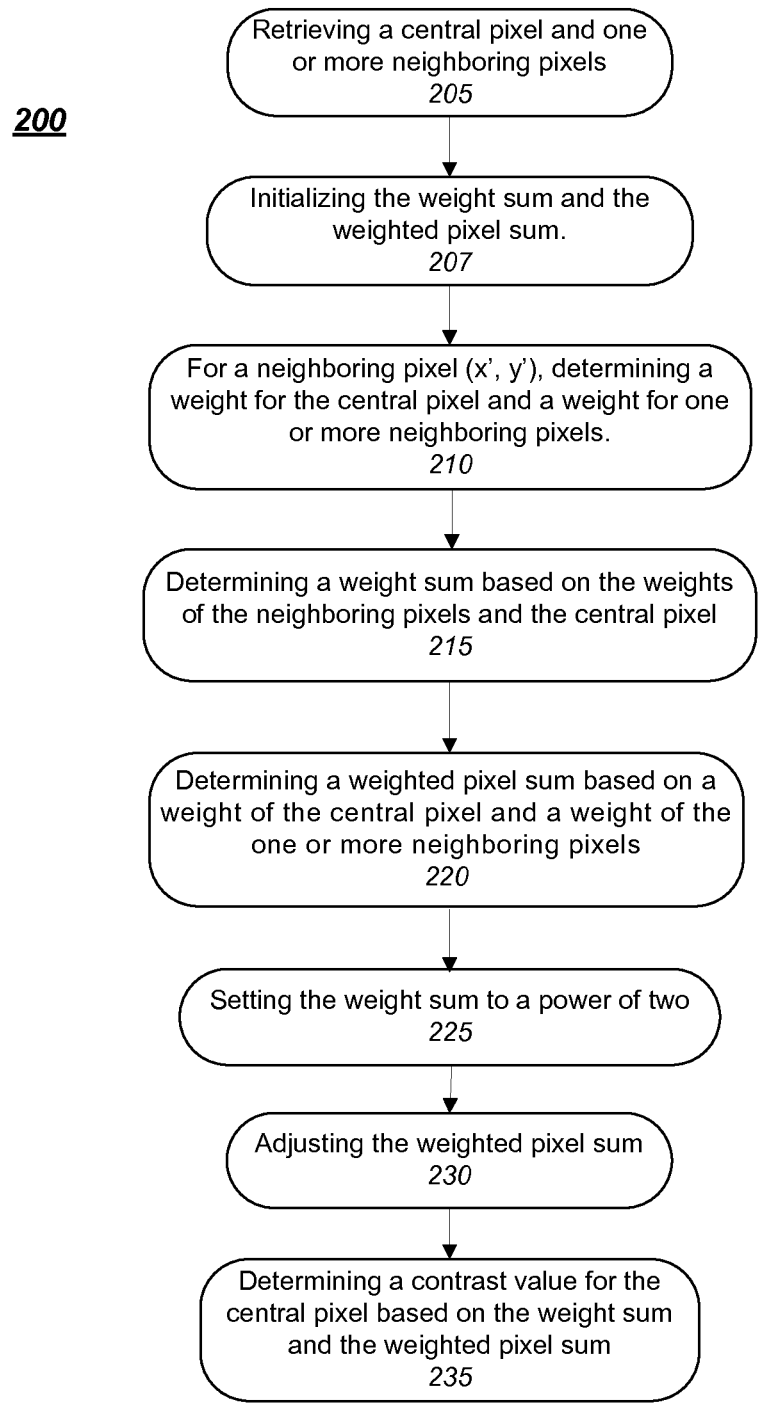
FIG. 2 illustrates one embodiment of a first logic diagram.

FIG. 2 illustrates one embodiment of a logic flow 200. The logic flow 200 may be performed by various systems and/or devices and may be implemented as hardware, software, firmware, and/or any combination thereof, as desired for a given set of design parameters or performance constraints. For example, one or more operations of the logic flow 200 may be implemented by executable programming or computer-readable instructions to be executed by a logic device (e.g., computer, processor). Logic flow 200 may describe the features described above with reference to apparatus 100.

In various embodiments, an image may be a graphic, a photograph and/or a video image. Based on the image neighbor window, parameters may be determined for the length and width. In an embodiment, the length and width of the neighbor window may be odd numbers. Using the length and width of the neighbor window, a shift number may be determined. In an embodiment, a shift number may be determined by rounding up to the nearest integer of the log base two of the neighbor window size. In an embodiment, the shift number may be the ceiling of the log base two of the width of the neighbor window times the length of the neighbor window. As show below in Equation 1, the neighbor window length and width may be represented as (nWindowX, nWindowY). The shift number may be represented as nShift.

$$n\text{Shift}=\log_2(n\text{WindowX}*n\text{WindowY}) \quad \text{Equation 1}$$

An image may comprise pixels. A pixel is a single point in an image. For one or more pixels in the image, a contrast may be determined. In an embodiment, a central pixel and one or more neighboring pixels may be determined 205. A central pixel may be the input pixel for which a contrast pixel may be determined. The neighboring pixel may be a pixel surrounding the central pixel. For a central pixel input, nInput(x, y), a contrast of the central pixel, Contrast(x, y), may be determined.

Figure 3A:
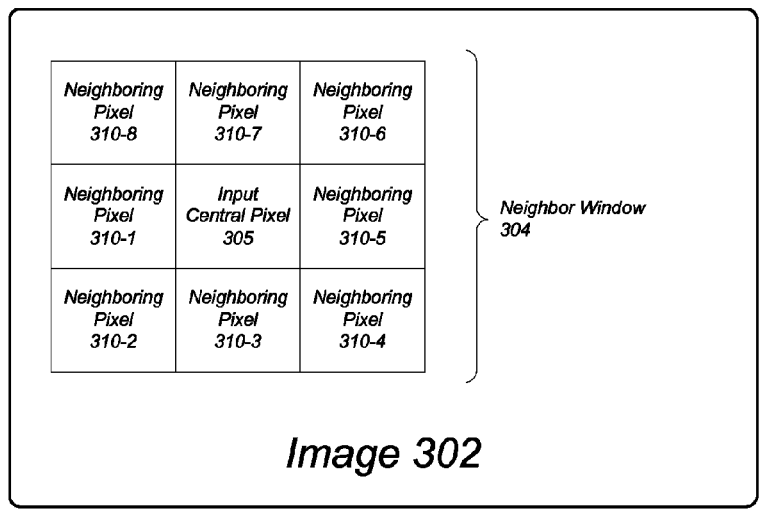
FIG. 3A illustrates one embodiment of pixels in an image.

FIG. 3A illustrates one embodiment of pixels in an image. As shown in FIG. 3A, the image 302 includes neighbor window 304 with an input central pixel 305. In an embodiment, the neighboring pixels 310-1-$m$ may be located in any position proximate, adjacent and/or adjoining to central pixel 305, as long as they are within the neighbor window of the central pixel 305. For example, neighboring pixel 310-5 may be adjacent to central pixel 305. In FIG. 3A, the length of the neighbor window may be 3 and the width of the neighbor window may be 3.

Referring back to FIG. 2, the neighboring pixel may be determined based on the central pixel and the size of the neighbor window. As shown below, the neighbor window, (nWindowX, nWindowY), and the input of the central pixel, nInput(x, y), may be used to determine the input of the neighboring pixel, nInput(x', y'). As shown below in Equations 2 and 3, the neighboring pixel (x', y') may be equal to:

$$\frac{x-(n\text{WindowX}-1)}{2} \leq x' \leq \frac{x+(n\text{WindowX}-1)}{2} \quad \text{Equation 2}$$

$$\frac{y-(n\text{WindowY}-1)}{2} \leq y' \leq \frac{y+(n\text{WindowY}-1)}{2} \quad \text{Equation 3}$$

In an embodiment, the central pixel may be a neighboring pixel of itself.

In an embodiment, the weight of the neighboring pixel may be initialized. In an embodiment, the weight of the neighboring pixel may be set to zero. In an embodiment, the weight sum may be the sum of the weights of all the neighboring pixels. As discussed below, a neighboring pixel will have a weight of either one or zero. In an embodiment, the weight sum may be initialized 207 and set to zero, as shown in Equation 4.

$$n\text{WeightSum}=0 \quad \text{Equation 4}$$

In an embodiment, a weighted pixel may be the input of the neighboring pixel times the weight of that pixel. In an embodiment, the weighted pixel sum may be the sum of the products of every neighboring pixel value and the corresponding weight of that neighboring pixel. The weighted pixel sum may be initialized 207. In an embodiment, the weighted pixel sum may be initialized and set zero, as shown in Equation 5.

$$n\text{WeightedPixelSum}=0 \quad \text{Equation 5}$$

For a neighboring pixel (x', y'), a neighboring pixel weight may be determined 210 based on the central pixel and the neighboring pixel. A threshold may be represented as nThreshold. In an embodiment, a threshold may be determined for the image. The threshold may be the contrast between a first pixel and a neighboring second pixel. In an embodiment, the threshold may be used to determine when a pixel comprises an edge. In an embodiment, adjustments may be made to the threshold to increase a picture contrast. In an embodiment, the threshold may be between about 0 and about 15 intensity, if the pixel value is in between 0-255.

In an embodiment, it may be determined whether the absolute value of the input of the neighboring pixel minus input of the central pixel is less than a threshold. The absolute value of the input of the neighboring pixel minus the input of the central pixel may be equal to or greater than the threshold, as shown in Equation 6.

$$|n\text{Input}(x',y')-n\text{Input}(x,y)| \geq n\text{Threshold} \quad \text{Equation 6}$$

In an embodiment, if the absolute value of the input of the neighboring pixel minus the input of the central pixel is equal to or greater than the threshold, then there is a high contrast between the central pixel and the neighboring pixel. In an embodiment, if the absolute value of the input of the neighboring pixel minus the input of the central pixel is greater than the threshold, then there is a high contrast between the central pixel and the neighboring pixel. In an embodiment, the central pixel may be an edge within the image. If the absolute value of the input of the neighboring pixel minus the input of the central pixel is greater than or equal to the threshold, then no smoothing occur and the weight of the neighboring pixel may be set to zero.

In an embodiment, the absolute value of the neighboring pixel minus the central pixel may be less than the threshold, nThreshold, as shown in Equation 7.

$$|n\text{Input}(x',y')-n\text{Input}(x,y)| < n\text{Threshold} \quad \text{Equation 7}$$

If the absolute value of the input of the neighboring pixel minus the input of the central pixel is less than the threshold, then the central pixel may be smoothed by the neighboring pixel. When the absolute value of the input of the neighboring pixel minus the input of the central pixel is less than the threshold, the weight of the neighboring pixel may be set to one. A weight sum, nWeightSum, may be determined 215 based on the weights of the neighboring pixels and the central pixel. The new weight sum, nWeightSum, may be calculated as shown in Equation 8.

$$n\text{WeightSum}=n\text{WeightSum}+1 \quad \text{Equation 8}$$

Since the weight of the neighboring pixel is set to one when the absolute value of the input of the neighboring pixel minus the input of the central pixel is less than the threshold, a weighted pixel, nWeightedPixel, may be determined. A weighted pixel may be the input of the neighboring pixel times the weight of that pixel. A weighted pixel sum may be determined 220 based on a weight of a central pixel and a weight of one or more neighboring pixels. As shown in Equation 9, the weighted pixel may be equal to the input (i.e., the intensity) of the neighboring pixel times the weight of the neighboring pixel.

$$n\text{WeightedPixel}=n\text{Input}(x',y')*\text{weight}(x',y') \quad \text{Equation 9}$$

As the weight of the neighboring pixel may be equal to one when the absolute value of the input of the neighboring pixel minus the input of the central pixel is less than the threshold, the weighted pixel sum of the central pixel may be determined to be the weighted pixel sum plus a neighboring pixel (x', y'). In an embodiment, the weighted pixel sum may be the sum of all the inputs of the neighboring pixels that have a weight of one. In an embodiment, the weighted pixel sum may include the weight and input (i.e., intensity) of the central pixel. The weighted pixel sum, nWeightedPixelSum, may be calculated, as shown in Equation 10.

$$n\text{WeightedPixelSum}=n\text{WeightedPixelSum}+n\text{Input}(x',y') \quad \text{Equation 10}$$

In an embodiment, the weight sum may be set 225 to a power of two. In an embodiment, the weight sum may be set to a target weight sum. The target weight sum, TargetWeightSum may be 2 to the shift number, as shown in Equation 11a.

$$\text{TargetWeightSum}=2^{n\text{Shift}} \quad \text{Equation 11a}$$

$$\text{IncreaseAmount}=2^{n\text{Shift}}-n\text{WeightSum} \quad \text{Equation 11b}$$

$$n\text{WeightSum}=n\text{WeightSum}+\text{IncreaseAmount} \quad \text{Equation 11c}$$

An increase amount, IncreaseAmount, between the weight sum, from Equation 8, and the target weight sum may be determined as shown in Equation 11b. In an embodiment, the weight sum may be set equal to the weight sum plus the increase amount, as shown in Equation 11c. In an embodiment, the weight sum may be set equal to the target weight sum. In an embodiment, the weight sum, nWeightSum, may be set equal to a power of two.

By using the equation above to determine the weight sum, the weight sum may be set to a power of two. As the weight sum is a power of two, floating point operations and/or integer division operations may be avoided when determining the contrast for the central pixel.

In an embodiment, the central pixel weight may be adjusted. In an embodiment, the central pixel weight may be set to a new weight based on the new weight sum. In an embodiment, the central pixel weight, Weight(x, y) may be set equal to the central pixel weight plus the increase amount, as shown in Equation 12.

$$\text{Weight}(x,y)=\text{Weight}(x,y)+\text{IncreaseAmount} \quad \text{Equation 12}$$

In an embodiment, $2^{n\text{Shift}}-n\text{WeightSum}$ may be used to determine a target central pixel weight and increase amount for the contrast of the central pixel. In an embodiment, the target weight sum may be two to the shift number. In order to ensure that the weight sum is a power of 2, the weight sum calculated in Equation 8 may be subtracted from the target weight sum to determine an increase amount. The increase amount may then be added to the central pixel weight to determine the new central pixel weight to be used in the contrast central pixel. For example, if the shift number is 3, then the target weight sum may be 8 (i.e., $2^3$). If the current weight sum (i.e., the weight sum calculated in Equation 8) is 6, then the increase amount may be 2 (i.e., 8−6). The central pixel weight may be increased to 3 (i.e., 2+1).

In an embodiment, the weighted pixel sum may be adjusted 230. In an embodiment, the weighted pixel sum may be adjusted because of the new weight of the central pixel. In an embodiment, the weighted pixel sum may be set equal to the weighted pixel sum, from Equation 9, plus the increase amount times the input of the central pixel. In an embodiment, the weighted pixel sum of the central pixel may be set equal to the weighted pixel sum of the central pixel plus two to the shift number minus the weight sum of the neighboring pixels times the input of the central pixel, as shown in Equation 13 below.

$$n\text{WeightedPixelSum}=n\text{WeightedPixelSum}+(2^{n\text{Shift}}-n\text{WeightSum})*n\text{Input}(x,y) \quad \text{Equation 13}$$

In an embodiment, a contrast value of the central pixel may be determined 235 based on the weighted pixel sum of the central pixel. In an embodiment, the contrast of the central pixel may be the weighted pixel sum divided by the weight sum. Since the weight sum is equal to two to the shift number, the contrast of the central pixel may be the weighted pixel sum moved by the shift number, as shown in Equation 14 below.

$$\text{Contrast}(x,y)=n\text{WeightedPixelSum}>>n\text{Shift} \quad \text{Equation 14}$$

Using the example above, the weighted pixel sum may be right shifted by 3 since 8 is the target weight sum and $2^3$ is 8.

Figure 3B:
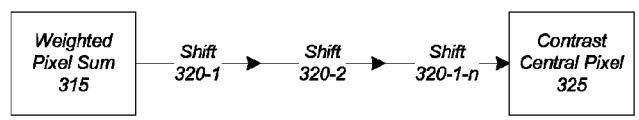
FIG. 3B illustrates one embodiment of a contrast pixel.

FIG. 3B illustrates one embodiment of a contrast pixel, Contrast (x, y). As shown in FIG. 3B, contrast central pixel 325 may be right shifted 320-1-n from the weighted pixel sum 315 of the central pixel. As discussed in the example above, the contrast central pixel 325 may be right shifted 320-1-n by three from the weighted pixel sum 315.

Figure 4:
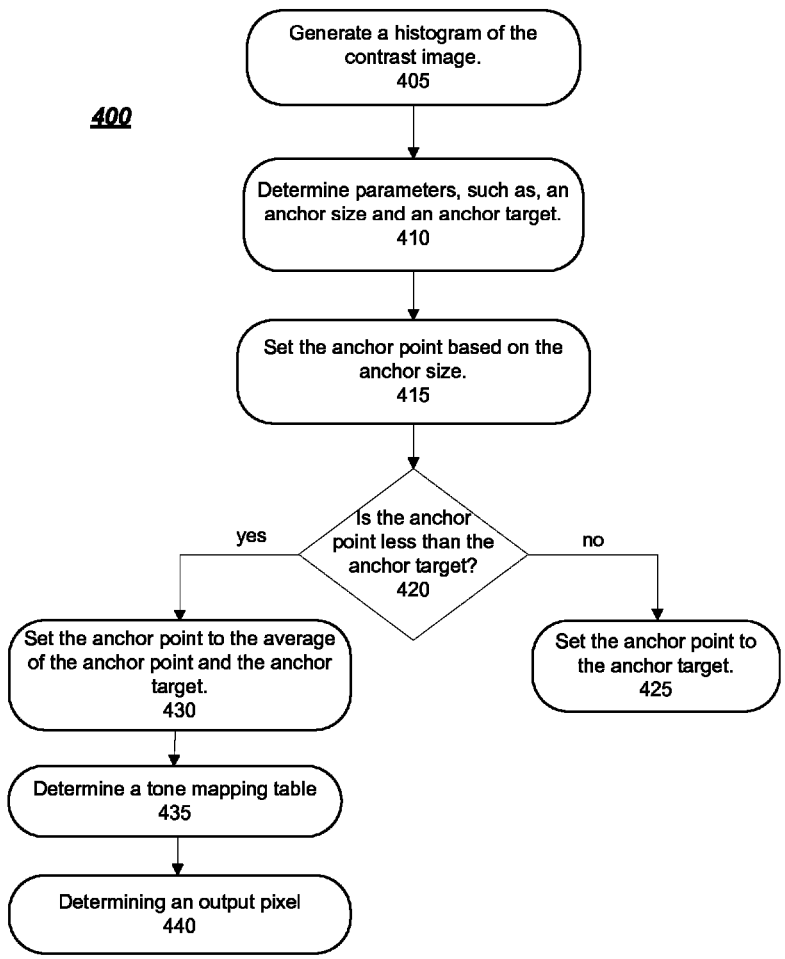
FIG. 4 illustrates one embodiment of a second logic diagram.

FIG. 4 illustrates one embodiment of a second logic diagram 400. Similar to logic flow 200, the second logic flow 400 may be performed by various systems and/or devices and may be implemented as hardware, software, firmware, and/or any combination thereof, as desired for a given set of design parameters or performance constraints. Logic flow 400 may describe the features described above with reference to logic flow 200 and apparatus 100.

As described in FIG. 2, an edge preserving smoothing filter may be applied 210 to a pixel, nInput(x, y), of an original luminance image. By applying the edge preserving smoothing filter to the image, a contrast image, Contrast(x, y), may be determined 235. Using the contrast image, the brightness of the original image may be enhanced. Referring back to FIG. 4, a histogram of the contrast image may be generated 405. The histogram of the contrast image may include 256 bins with each bin representing a luminance value between 0 and 255.

Parameters for enhancing the brightness of the contrast image, such as, but not limited to, an anchor size, an anchor target and an anchor point, may be determined 410. A parameter may be an anchor size, nAnchorSize. The anchor size, nAnchorSize, maybe used to determine key places to adjust the histogram. In an embodiment, the anchor size, nAnchorSize may be determined using the total number of pixels in the contrast image, nTotal, and an anchor segment, nAnchorSegment. In an embodiment, the anchor segment, nAnchorSegment, may be the number of classifications to divide the bins. For example, the anchor segment, nAnchorSegment, may be set to 3. The first segment may be the darkest tones, the second segment may be the middle tones and the third segment may be the brightest tones. In an embodiment, the anchor segment may be set to 2 or 4. Other embodiments are not limited to these examples. The anchor size, nAnchorSize, may be equal to the total number of pixels in the contrast image divided by the anchor segment, as shown in Equation 15 below.

$$n\text{AnchorSize}=n\text{Total}/n\text{AnchorSegment} \quad \text{Equation 15}$$

The anchor target, nAnchorTarget, may be the target number of pixel values in a first segment. As the pixel values should be spread equally throughout the anchor segments, the anchor target, nAnchorTarget, may be determined based on maximum pixel value 255 divided by the anchor segment, nAnchorSegment, as shown in Equation 16 below.

$$n\text{AnchorTarget}=255/n\text{AnchorSegment} \quad \text{Equation 16}$$

For example, if there are three anchor segments, then the anchor target would set each segment equal to $\frac{1}{3}^{rd}$ of the pixel values. According to Equation 16, the first segment would have an anchor target of 255 divided by 3.

In an embodiment, an anchor point, nAnchor, may be set based on the anchor size, nAnchorSize. In an embodiment, the number of bins in the histogram that correspond to the first segment may be determined 415. Using the histogram, the number of pixels in each bin from the first bin, bin [0], that is equal to the nAnchorSize may be determined.

Figure 5:
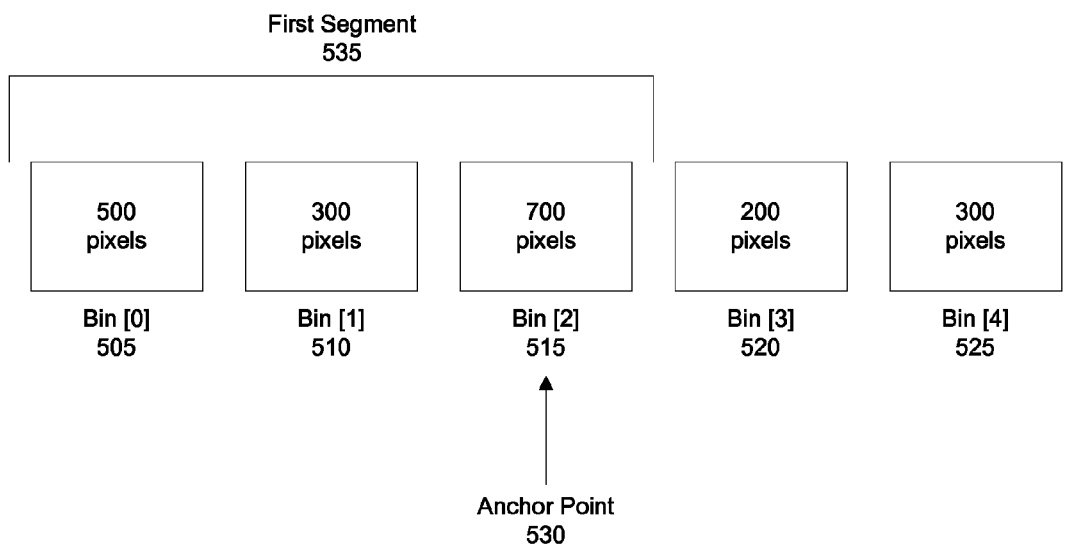
FIG. 5 illustrates one embodiment of determining an anchor point for a contrast image.

FIG. 5 illustrates one embodiment of determining an anchor point for a contrast image. FIG. 5 includes the first five bins, 505, 510, 515, 520 and 525 of a histogram. If the anchor size, nAnchorSize, equals 1000, the anchor point 530, nAnchor, may be determined based on the number of pixels in the bin. The anchor point 530, nAnchor, may be determined such that the number of pixels darker than the anchor point, nAnchor, is just above the anchor size, nAnchorSize. The first bin, bin [0] 505 may have 500 pixels. The second bin, bin [1] 515 may have 300 pixels. The third bin, bin [2] 520 may have 700 pixels. As the sum of bin [0] through bin [2] is just above the anchor size, nAnchorSize, the anchor point 530, nAnchor, may be set to 2. The anchor point 530, nAnchor, may mark the end of the first segment 535.

Referring back to FIG. 4, the anchor point, nAnchor, may be compared 420 to the anchor target, nAnchorTarget. If the anchor point, nAnchor, is greater than or equal to the anchor target, nAnchorTarget, then the anchor point, nAnchor, may be set 425 to the anchor target, nAnchorTarget, as shown in Equation 16.

If $n\text{Anchor} \geq n\text{AnchorTarget}$, $$\text{then } n\text{Anchor}=n\text{AnchorTarget}. \quad \text{Equation 16}$$

When the anchor point, nAnchor, is greater than or equal to the anchor target, nAnchorTarget, then the anchor point, nAnchor, then the anchor point is as bright as or brighter than the anchor target. Accordingly, there is no need to brighten the anchor point.

If the anchor point, nAnchor, is less than the anchor target, nAnchorTarget, then the anchor point, nAnchor, may be set 430 to the average of the anchor point, nAnchor, and the anchor target, nAnchorTarget, as shown in Equation 17.

If $n\text{Anchor} < n\text{AnchorTarget}$, $$\text{then } n\text{Anchor}=(n\text{Anchor}+n\text{AnchorTarget})/2 \quad \text{Equation 17}$$

When the anchor point, nAnchor, is less than the anchor target, nAnchorTarget, then the anchor point may be brightened by setting the anchor point to the average of the anchor point, nAnchor, and the anchor target, nAnchorTarget.

In an embodiment, a tone mapping may be determined 435. The tone mapping may be computed using a piece-wise linear function with two linear segments, as shown in Equations 18 and 19. In an embodiment, a tone mapping table may be used. In an embodiment, the tone mapping may be a tone mapping curve.

$$\text{ToneCurve}[i]=n\text{AnchorTarget}*i/n\text{Anchor, for}$$
$$i=0 \sim n\text{Anchor} \quad \text{Equation 18}$$

$$\text{ToneCurve}[i]=n\text{AnchorTarget}+(255-n\text{AnchorTarget})$$
$$*(i-n\text{Anchor})/(255-n\text{Anchor}), \text{ for}$$
$$i=n\text{Anchor} \sim 255. \quad \text{Equation 19}$$

Using Equation 18, the tone curve output for bin [0] may equal 0 and the tone curve output for the anchor point bin may equal the anchor target. In other words, the luminance value for bin [0] will remain 0 and the luminance value for the anchor point will change to the anchor target. The bins between bin [0] and bin [anchor point] may be adjusted to increase their luminance value consistent with the linear equation above. For example, bin [3] may be adjusted to have a luminance value of 5.

Using Equation 19, the tone curve output for the anchor point, nAnchor, may be the anchor target and the tone curve output for the last bin, bin [255] may remain with a luminance value of 255.

In an embodiment, an output pixel may be determined 440. In an embodiment, tone mapping may be performed on the luminance image. In an embodiment, a ratio may be determined based on the contrast image.

When the contrast image is less than or equal to zero, then the image is completely dark and the image may not be brightened. When the pixel from the contrast image is less than or equal to zero, the output pixel may be set equal to the input pixel as shown in Equation 20.

If $\text{Contrast}(x,y) \leq 0$, $$\text{then Output}(x,y)=\text{Input}(x,y) \quad \text{Equation 20}$$

When the pixel from the contrast image is greater than zero, then a ratio may be determined. The ratio may be the tone curve output of the contrast pixel divided by the contrast pixel. In other words, the ratio may be the output of the tone curve divided by the input of the tone curve of the contrast pixel. The ratio may be used to amplify the brightness of the filtered pixel. The output pixel may be the ratio times the original input pixel. In an embodiment, determining an output pixel based on the tone mapping curve may include determining a contrast adjustment ratio based on the tone mapping of the contrast image and applying the contrast adjustment ratio to one or more pixels of an original image. By determining a ratio and then multiplying the ratio by the input pixel of the original image, the output pixel may result in a smoothing brighten luminance for the pixel, as shown in Equation 21.

If $\text{Contrast}(x,y)>0$, $$\text{then } d\text{Ratio}=\text{ToneCurve}[\text{Contrast}(x,y)]/\text{Contrast}(x,y)$$
$$\text{Output}(x,y)=d\text{Ratio}*\text{Input}(x,y) \quad \text{Equation 21}$$

The embodiments discussed allow a brightness enhancing edge-preserving smooth filtering for low power architectures. The output for the central pixel may be determined using a low power architecture and/or device. The embodiments discussed above may not require floating point operations.

It should be understood that in some embodiments that logic flows 200 and 400 may be implemented or arranged to perform tasks in parallel, including processing a plurality of threads and controlling a plurality of cores at substantially the same time. Moreover, it should also be understood that the logic flows 200 and 400 are only one example of a logic flow and that different numbers, orders and/or arrangements of the operations described in logic flows 200 and 400 could be implemented and still fall within the described embodiments. Other embodiments are described and claimed.

Figure 6:
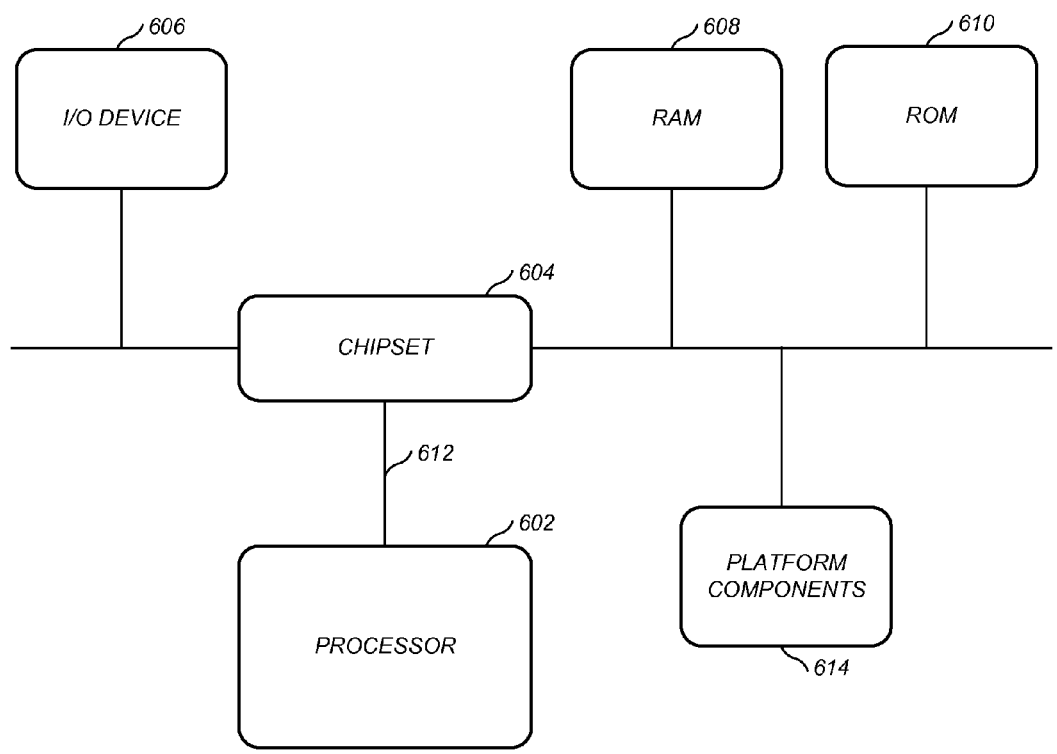
FIG. 6 illustrates one embodiment of a system.

FIG. 6 is a diagram of an exemplary system embodiment. In particular, FIG. 6 is a diagram showing a system 600, which may include various elements. For instance, FIG. 6 shows that system 600 may include a processor 602, a chipset 604, an input/output (I/O) device 606, a random access memory (RAM) (such as dynamic RAM (DRAM)) 608, and a read only memory (ROM) 610, and various platform components 614 (e.g., a fan, a crossflow blower, a heat sink, DTM system, cooling system, housing, vents, and so forth). These elements may be implemented in hardware, software, firmware, or any combination thereof. The embodiments, however, are not limited to these elements.

As shown in FIG. 6, I/O device 606, RAM 608, and ROM 610 are coupled to processor 602 by way of chipset 604. Chipset 604 may be coupled to processor 602 by a bus 612. Accordingly, bus 612 may include multiple lines.

Processor 602 may be a central processing unit comprising one or more processor cores and may include any number of processors having any number of processor cores. The processor 602 may include any type of processing unit, such as, for example, central processing unit (CPU), multi-processing unit, a reduced instruction set computer (RISC), a processor that have a pipeline, a complex instruction set computer (CISC), a digital signal processor (DSP), and so forth.

Although not shown, the system 600 may include various interface circuits, such as an Ethernet interface and/or a Universal Serial Bus (USB) interface, and/or the like. In some exemplary embodiments, the I/O device 606 may comprise one or more input devices connected to interface circuits for entering data and commands into the system 600. For example, the input devices may include a keyboard, mouse, touch screen, track pad, track ball, isopoint, a voice recognition system, and/or the like. Similarly, the I/O device 606 may comprise one or more output devices connected to the interface circuits for outputting information to an operator. For example, the output devices may include one or more displays, printers, speakers, and/or other output devices, if desired. For example, one of the output devices may be a display. The display may be a cathode ray tube (CRTs), liquid crystal displays (LCDs), or any other type of display.

The system 600 may also have a wired or wireless network interface to exchange data with other devices via a connection to a network. The network connection may be any type of network connection, such as an Ethernet connection, digital subscriber line (DSL), telephone line, coaxial cable, etc. The network may be any type of network, such as the Internet, a telephone network, a cable network, a wireless network, a packet-switched network, a circuit-switched network, and/or the like.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable or computer-readable medium or article which may store an instruction, a set of instructions or computer executable code that, if executed by a machine or processor, may cause the machine or processor to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, volatile or non-volatile memory or media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

It is emphasized that the Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter that lies in less than all features of a single disclosed embodiment. Thus the following claims are hereby incorporated into the Detailed Description, with each claim standing on its own as a separate preferred embodiment. In the appended claims, the terms "including" and "in which" are used as the plain-English equivalents of the respective terms "comprising" and "wherein," respectively. Moreover, the terms "first," "second," and "third," etc. are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An article comprising a non-transitory computer-readable storage medium containing instructions that when executed by a processor enable a system to:
    determine a weighted pixel sum based on a weight of a central pixel and a weight of one or more neighboring pixels of an original image;
    set a weight sum for the central pixel to a power of two;
    determine a contrast image of the central pixel based on the weighted pixel sum and the weight sum;
    generate a histogram of the contrast image;
    set one or more parameters based on the histogram;
    determine a tone mapping for the contrast image based on the one or more parameters; and
    determine an output pixel based on the tone mapping.

2. The article of claim 1 comprising instructions that when executed enable the system to to set an anchor point.

3. The article of claim 2 comprising instructions that when executed enable the system to:
    determine an anchor target;
    set the anchor point based on the anchor point and the anchor target when the anchor point is less than the anchor target; and
    set the anchor point to the anchor target when the anchor point is greater than the anchor target.

4. The article of claim 1 comprising instructions that when executed enable the system to
    determine a contrast adjustment ratio based on the tone mapping; and
    apply the contrast adjustment ratio to one or more pixels of an original image.

5. The article of claim 1 comprising instructions that when executed enable the system to enhance brightness of the contrast image.

6. The article of claim 1 comprising instructions that when executed enable the system to obtain the contrast image from an original image.

7. The article of claim 1 comprising instructions that when executed enable the system to:
    set an anchor size based on a number of pixels in the contrast image and an anchor segment; and
    set an anchor point based on the anchor size.

8. The article of claim 1 comprising instructions that when executed enable the system to determine a piecewise-linear equation to apply to one or more bins of the histogram.

9. An apparatus, comprising:
    logic at least a portion of which is in hardware, the logic to determine a weighted pixel sum based on a weight of a central pixel and a weight of one or more neighboring pixels of an original image, set a weight sum for the central pixel to a power of two, determine a contrast image of the central pixel based on the weighted pixel sum and the weight sum, generate a histogram of the contrast image, set one or more parameters based on the histogram, determine a tone mapping for the contrast image based on the one or more parameters, and determine an output pixel based on the tone mapping.

10. The logic of claim 9, the logic to obtain the contrast image from an original image.

11. The logic of claim 9, the logic to:
    determine a contrast adjustment ratio based on the tone mapping, and
    apply the contrast adjustment ratio to one or more pixels of an original image.

12. The logic of claim 9, the logic to:
    set an anchor size based on a number of pixels in the contrast image and an anchor segment, and
    set an anchor point based on the anchor size.

13. The logic of claim 9, the logic to enhance the brightness of the contrast image.

14. A method comprising:
    generating a histogram of a contrast image;
    determining one or more parameters for the contrast image;
    determining a tone mapping for the contrast image based on the one or more parameters;
    determining an output pixel based on the tone mapping;
    determining an anchor size and an anchor target for the contrast image; and
    setting an anchor point based on the anchor size;
    wherein setting the anchor point comprises setting the anchor point based on the anchor point and the anchor target when the anchor point is less than the anchor target or setting the anchor point to the anchor target when the anchor point is greater than the anchor target.

15. The method of claim 14, comprising:

setting the anchor size based on a number of pixels in the contrast image and an anchor segment; and setting an anchor target based on the anchor segment.

16. The method of claim 14, comprising: determining a piecewise-linear equation to apply to one or more bins of the histogram based on an anchor point.

17. The method of claim 14, comprising:

determining a contrast adjustment ratio based on the tone mapping of the contrast image; and applying the contrast adjustment ratio to one or more pixels of an original image.

* * * * *

UNITED STATES PATENT AND TRADEMARK OFFICE
CERTIFICATE OF CORRECTION

PATENT NO.       : 8,538,148 B2  
APPLICATION NO.  : 12/890372  
DATED            : September 17, 2013  
INVENTOR(S)      : Jianping Zhou Page 1 of 1

It is certified that error appears in the above-identified patent and that said Letters Patent is hereby corrected as shown below:

In the Claims

In column 11, line 67, in claim 2, delete "to to" and insert -- to --, therefor.

Signed and Sealed this
Tenth Day of December, 2013

Margaret A. Focarino
*Commissioner for Patents of the United States Patent and Trademark Office*